(12) United States Patent
Wrobel (10) Patent No.: US 10,279,810 B2
(45) Date of Patent: May 7, 2019

(54) SYSTEMS AND METHODS FOR PREEMPTIVELY ADJUSTING VEHICLE PARAMETERS ACCORDING TO PREDICTED CONTROLS RELATING TO A TOLL BOOTH

(71) Applicant: Toyota Motor Engineering & Manufacturing North America, Inc., Erlanger, KY (US)

(72) Inventor: Shannon Alicia Wrobel, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 79 days.

(21) Appl. No.: 15/430,770

(22) Filed: Feb. 13, 2017

(65) Prior Publication Data

US 2018/0154898 A1 Jun. 7, 2018

Related U.S. Application Data

(60) Provisional application No. 62/429,243, filed on Dec. 2, 2016.

(51) Int. Cl.
*B60W 30/18* (2012.01)
*B60W 20/11* (2016.01)
(Continued)

(52) U.S. Cl.
CPC ...... *B60W 30/18009* (2013.01); *B60W 10/04* (2013.01); *B60W 10/184* (2013.01); *B60W 10/20* (2013.01); *B60W 20/11* (2016.01); *B60W 50/10* (2013.01); *G05D 1/0238* (2013.01); *B60W 2420/42* (2013.01); *B60W 2420/52* (2013.01);
(Continued)

(58) Field of Classification Search
CPC ............ B60W 30/18009; B60W 20/11; G05D 1/0238
See application file for complete search history.

(56) References Cited

U.S. PATENT DOCUMENTS

9,126,594 B2 9/2015 Kawamata et al.
9,165,477 B2 10/2015 Wilson
(Continued)

*Primary Examiner* — Basil T. Jos
(74) *Attorney, Agent, or Firm* — Christopher G. Darrow; Darrow Mustafa PC (57) ABSTRACT

System, methods, and other embodiments described herein relate to preemptively adjusting operating parameters of a vehicle. In one embodiment, a method includes determining a control profile for the vehicle based, at least in part, on an environmental context and in response to identifying that the vehicle is located proximate to a roadway location for which the operating parameters are to be optimized. The environmental context characterizes at least current surroundings of the vehicle including the roadway location. The control profile indicates a predicted control input that is expected to be received through a driver input system for controlling the vehicle. The method includes adjusting the operating parameters of the vehicle according to the control profile to preemptively optimize the vehicle in anticipation of the predicted control input. The method includes controlling the vehicle according to the operating parameters upon receiving a driver control input through the driver input system.

20 Claims, 5 Drawing Sheets

(51) Int. Cl.
  *G05D 1/02* (2006.01)
  *B60W 10/04* (2006.01)
  *B60W 10/184* (2012.01)
  *B60W 10/20* (2006.01)
  *B60W 50/10* (2012.01)

(52) U.S. Cl.
  CPC ..... *B60W 2550/10* (2013.01); *B60W 2550/14* (2013.01); *B60W 2550/20* (2013.01); *B60W 2600/00* (2013.01); *G05D 2201/0213* (2013.01); *Y10S 903/93* (2013.01)

(56) References Cited

U.S. PATENT DOCUMENTS

| | | |
|---|---|---|
| 2009/0216415 A1 | 8/2009 | Iwatsuki et al. |
| 2012/0022764 A1 | 1/2012 | Tang et al. |
| 2015/0291146 A1 | 10/2015 | Prakah-Asante et al. |
| 2016/0046170 A1 | 2/2016 | Lu |
| 2016/0171885 A1* | 6/2016 | Lynch .................. G08G 1/0129 701/117 |

\* cited by examiner

SYSTEMS AND METHODS FOR PREEMPTIVELY ADJUSTING VEHICLE PARAMETERS ACCORDING TO PREDICTED CONTROLS RELATING TO A TOLL BOOTH

CROSS REFERENCE TO RELATED APPLICATIONS

This application claims benefit of U.S. Provisional Application No. 62/429,243, filed on Dec. 2, 2016, which is herein incorporated by reference in its entirety.

TECHNICAL FIELD

The subject matter described herein relates in general to systems for preemptively adjusting operation of a vehicle and, more particularly, to preemptively adjusting operating parameters of the vehicle in anticipation of driver inputs relating to a toll booth.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Motor vehicles are generally tuned or otherwise configured to operate according to received control inputs. A driver/operator provides the control inputs using interface devices, such as a steering wheel, pedals, etc. Accordingly, the vehicle receives the control inputs as the driver reacts to changing conditions while driving the vehicle. However, because the driver generally operates the vehicle reactively according to changing conditions along a route, the provided inputs are also reactive. Thus, the vehicle brakes, accelerates, steers, shifts, and so on as the inputs are received in a reactive manner that may not be an optimal mode of operation. In other words, because the vehicle controls various systems in response to the driver inputs, the systems are not primed or otherwise optimized to perform a particular task. Instead, the vehicle systems are tuned to operate in a generalized manner so as to provide an acceptable, but not optimized response according to a wide array of possible inputs. As a result, the vehicle may suffer from difficulties such as reduced fuel economy, reduced performance, and so on.

SUMMARY

An example of a preemptive adjustment system that preemptively adjusts operating parameters of a vehicle in anticipation of predicted control inputs is presented herein. In one embodiment, the preemptive adjustment system detects when the vehicle is proximate to a roadway location, such as a toll booth for which control inputs can be predicted. Accordingly, the preemptive adjustment system anticipates a control input of the vehicle according to a detected toll booth using information about, for example, a current location of the vehicle. In this way, the preemptive adjustment system optimizes operating aspects of the vehicle in anticipation of either a deceleration or an acceleration input instead of responding reactively to control inputs using generalized settings for operating parameters of the vehicle.

In one embodiment, a preemptive adjustment system of a vehicle is disclosed. The preemptive adjustment system includes one or more processors and a memory that is communicably coupled to the one or more processors. The memory stores a context module that includes instructions that when executed by the one or more processors cause the one or more processors to determine a control profile for the vehicle based, at least in part, on an environmental context and in response to identifying that the vehicle is located proximate to a roadway location for which operating parameters of the vehicle are to be optimized. The environmental context characterizes at least current surroundings of the vehicle including the roadway location. The control profile indicates a predicted control input that is expected to be received through a driver input system for controlling the vehicle. The memory stores a control module including instructions that when executed by the one or more processors cause the one or more processors to adjust the operating parameters according to the control profile to preemptively optimize the vehicle in anticipation of the predicted control input. The control module includes instructions to control the vehicle according to the operating parameters upon receiving a driver control input through the driver input system.

In one embodiment, a non-transitory computer-readable medium is disclosed. The computer-readable medium stores instructions that when executed by one or more processors cause the one or more processors to perform the disclosed functions. The instructions include instructions to determine a control profile for the vehicle based, at least in part, on an environmental context and in response to identifying that the vehicle is located proximate to a roadway location for which operating parameters of the vehicle are to be optimized. The environmental context characterizes at least current surroundings of the vehicle including the roadway location. The control profile indicates a predicted control input that is expected to be received through a driver input system for controlling the vehicle. The instructions include instructions to adjust the operating parameters according to the control profile to preemptively optimize the vehicle in anticipation of the predicted control input. The instructions include instructions to control the vehicle according to the operating parameters upon receiving a driver control input through the driver input system.

In one embodiment, a method of preemptively adjusting operating parameters of a vehicle is disclosed. The method includes determining a control profile for the vehicle based, at least in part, on an environmental context and in response to identifying that the vehicle is located proximate to a roadway location for which the operating parameters are to be optimized. The environmental context characterizes at least current surroundings of the vehicle including the roadway location. The control profile indicates a predicted control input that is expected to be received through a driver input system for controlling the vehicle. The method includes adjusting the operating parameters of the vehicle according to the control profile to preemptively optimize the vehicle in anticipation of the predicted control input. The method includes controlling the vehicle according to the operating parameters upon receiving a driver control input through the driver input system.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with preemptively adjusting vehicle systems according to predicted control inputs are disclosed. As mentioned in the background, a vehicle may fail to operate various vehicle systems efficiently because the vehicle reactively controls the vehicle systems according to driver inputs as the inputs are received using a generalized configuration for the vehicle systems. However, using technologies such as location sensors, radar and/or other sensors in addition to the integration of computing systems with the vehicle, preemptive adjustments to the vehicle systems are realized so that aspects of the vehicle systems operate optimally according to particular circumstances.

For example, in one embodiment, a preemptive adjustment system uses various sensor inputs (e.g., camera monitoring, proximity sensors, GPS, etc.) to identify a current driving environment of the vehicle so that the vehicle systems can be preemptively optimized according to anticipated driver behaviors (e.g., control inputs). Thus, when the preemptive adjustment system identifies a circumstance such as the vehicle approaching a toll booth, the preemptive adjustment system can modify operating parameters of the vehicle to optimize a predicted upcoming deceleration. That is, the system identifies a current context of the vehicle and the system anticipates likely control inputs (e.g., strong deceleration) from the driver according to the context. Additionally, the system may also account for learned behaviors of the driver in that particular context.

As a result of knowing the context and being able to predict a likely driver input, the preemptive adjustment system preemptively modifies one or more operating parameters of the vehicle in anticipation of the driver inputs. As one example, the preemptive adjustment system can modify charging of a battery, and/or preemptively increase engine speed when the system determines that a strong acceleration is likely to occur for a hybrid vehicle. In this way, the preemptive adjustment system modifies the operation of the vehicle prior to receiving an actual control input to improve fuel efficiency, vehicle performance, and/or vehicle safety when the actual control input is received.

Figure 1:
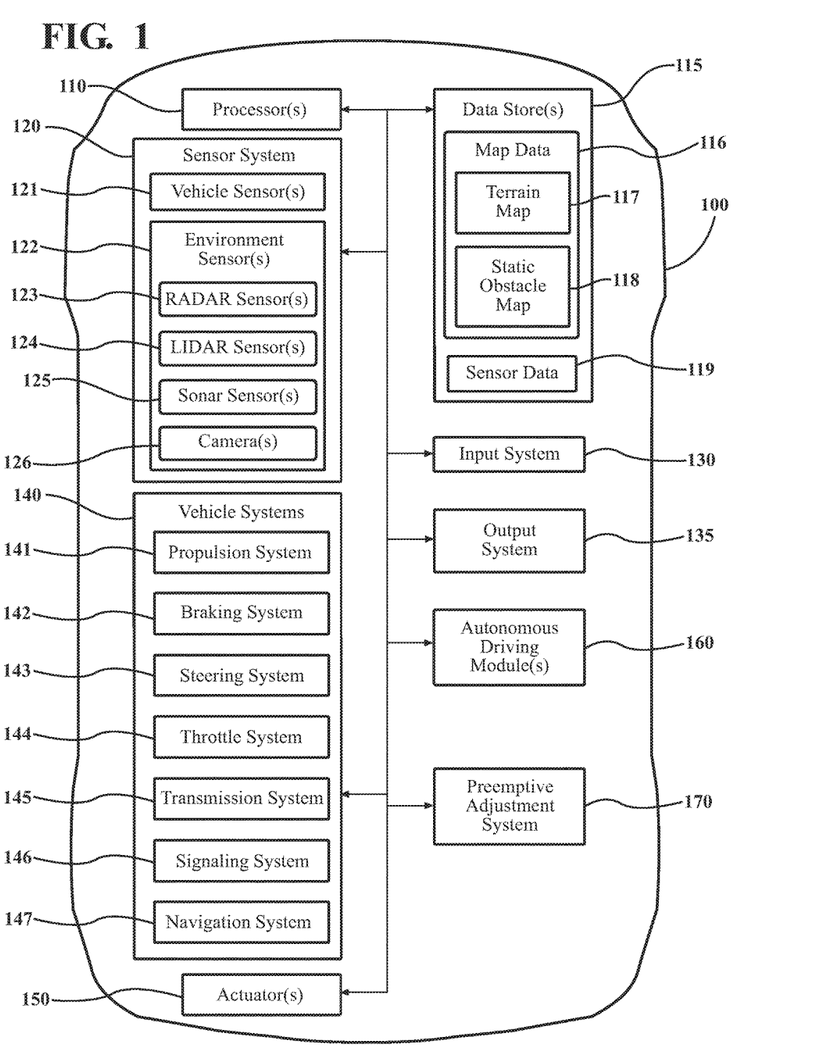
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport benefits from preemptively optimizing vehicle systems to improve the operation of the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a preemptive adjustment system 170 that is implemented to perform methods and other functions as disclosed herein relating to dynamically adjusting one or more vehicle systems 140 within the vehicle 100 to preemptively optimize the vehicle 100 in anticipation of a control input. The noted functions and methods will become more apparent with a further discussion of the figures.

Figure 2:
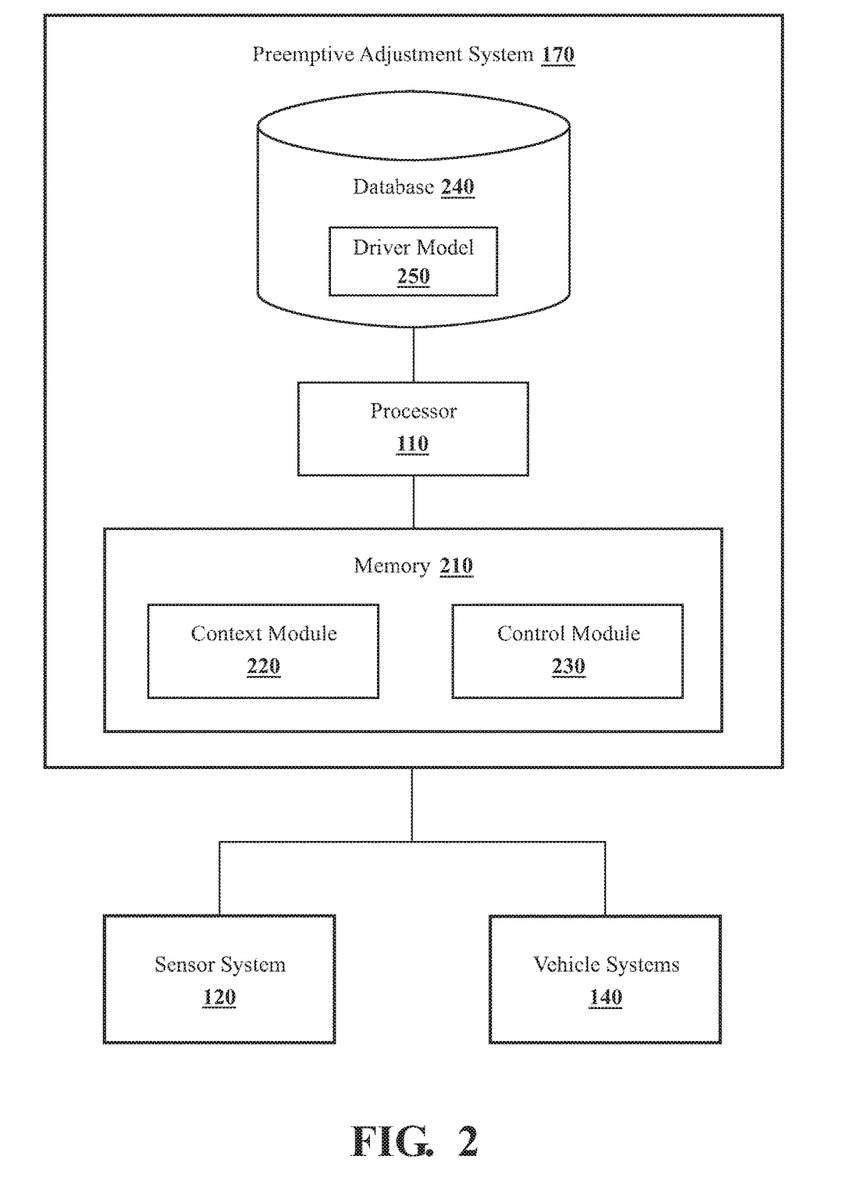
FIG. 2 illustrates one embodiment of a preemptive adjustment system that is associated with adjusting operating parameters of a vehicle to optimize the vehicle for a predicted control input.

With reference to FIG. 2, one embodiment of the preemptive adjustment system 170 of FIG. 1 is further illustrated. The preemptive adjustment system 170 is shown as including the processor 110 from the vehicle 100 of FIG. 1. Accordingly, the processor 110 may be a part of the preemptive adjustment system 170; the preemptive adjustment system 170 may include a separate processor from the processor 110 of the vehicle 100, or the preemptive adjustment system 170 may access the processor 110 through a data bus or another communication path. In one embodiment, the preemptive adjustment system 170 includes a memory 210 that stores a context module 220 and a control module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the context module 220 generally includes instructions that function to control the processor 110 to retrieve data from sensors of the sensor system 120 and analyze the data to generate an environmental context of the vehicle 100. In other words, the context module 220 includes instructions to identify whether the vehicle 100 is proximate to a roadway location where the vehicle systems 140 may be optimized. The context module 220, in one embodiment, identifies the roadway location from a plurality of designated locations and/or types of locations. For example, the context module 220 stores a list of roadway locations at which the system 170 is to optimize the operation of the vehicle 100. In an alternative embodiment, the context module 220 identifies the roadway locations according to a type such as a toll booth, a stoplight, a merge lane, and so on.

Thus, the context module 220 generates the environmental context according to surroundings (e.g., other vehicles, speed limits, location, road conditions, etc.) and a general context (e.g., current day, current time, route, current segment along a route, etc.) of the vehicle 100 so that when particular circumstances are encountered by the vehicle 100, the control module 230 can proactively optimize the vehicle systems 140.

In one embodiment, the control module 230 includes instructions that function to control the processor 110 to adjust one or more operating parameters of the vehicle 100 in anticipation of a particular control input (e.g., acceleration or deceleration) expected for the environmental context. In other words, instead of waiting for an acceleration input from the driver, the control module 230 preemptively adjusts one or more of the vehicle systems 140 in anticipation of an acceleration input or deceleration input as predicted by the context module 220 using the collected information about the environmental context.

With continued reference to the preemptive adjustment system 170, in one embodiment, the system 170 includes a database 240. The database 240 is, in one embodiment, a complex electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various determinations. In one embodiment, the database 240 includes lookup tables of control profiles, travel logs that provide a history of past trips/events (e.g., historical driving patterns) including driving inputs throughout the trips/events, data of the environmental context, driver information (e.g., ID) and so on.

The control profiles store, for example, control inputs that are expected to be provided through a driver input system of the vehicle 100 by the driver for the present environmental context. In other words, the control profiles indicate a likely manner (e.g., degree, duration, and/or pattern) in which the driver will, for example, accelerate under the present environmental context. Thus, the control profiles may each indicate a likelihood of acceleration for a particular degree (e.g., amount of accelerator pedal stroke) and duration (i.e., an amount time for which the accelerator pedal is depressed) that correlates with the present environmental context for the driver. As such, the control profiles may be customized to a given driver. While acceleration inputs are discussed, in one embodiment, the control inputs may be acceleration inputs, deceleration inputs, a combination of transmission shifting inputs with acceleration/deceleration inputs, and so on.

Moreover, in one embodiment, the control profiles are learned from behaviors of the driver (i.e., previous/historic control inputs) and are embodied by a driver model 250. The driver model 250 is, for example, a machine learning function that includes parameters embodying learned aspects of a behavior of the driver for separate environmental contexts. Accordingly, the context module 220, in one embodiment, observes driver control inputs to the vehicle 100 in relation to different environmental contexts (e.g., location, time of day, day of the year, traffic, road conditions, etc.). The context module 220 can store the control inputs from the driver in a log of the database 240 along with indicators of the environmental context at the time of the control inputs.

Subsequently, the context module 220 can apply various statistical methods and/or deep learning methods to the logged data in order to produce the control profiles stored in the database 240. In this way, the context module 220 can provide sets of control profiles for predicting acceleration inputs from the driver according to different environmental contexts. Additionally, the context module 220 can refine the control profiles over time as adjustments are made to the vehicle 100 and outcomes from corresponding acceleration events are logged.

Alternatively, in one embodiment, the database 240 is programmed with control profiles that are calibrated according to the different environmental contexts and/or according to different demographic segments. In other words, the control profiles may be determined according to a large sample size of drivers for separate environmental contexts in order to characterize expected inputs under different circumstances and according to age, gender, and so on. The control profiles are then stored in the database 240 as part of the driver model 250. For example, the control profiles may be stored according to indicators associated with different environmental contexts so that particular ones of the control profiles can be retrieved according to the present environmental context of the vehicle 100. Still, in a further embodiment, the control profiles may be initially determined and programmed into the database 240 and then customized/refined over time as patterns of a particular driver are learned through logging provided inputs as different environmental contexts are encountered during operation of the vehicle 100.

In yet another embodiment, the context module 220 dynamically generates a particular control profile using the driver model 250 when requested. That is, for example, where the driver model 250 is a learning algorithm, the context module 220 executes functions of the driver model 250 to produce the control profile upon obtaining data about a present environmental context. Accordingly, the driver model 250 is configured with various parameters that characterize behaviors of the driver according to different environmental contexts. Thus, the context module 220 parameterizes the environmental context and uses the parameters as an electronic input to the driver model 250. As a result, the context module 220, provides the control profile that corresponds to the environmental context on-the-fly.

In either case, the context module 220 identifies the environmental context (e.g., approaching a toll booth) using data collected through the sensor system 120. Additional aspects of the environmental context will be discussed subsequently; however, it should be appreciated that the sensor system 120 from which the data is obtained may include many different possible configurations of sensors. For example, in one embodiment, the sensor system 120 consists of a global position system (GPS) sensor. Alternatively, in another embodiment, the sensor system 120 may include additional sensors such as cameras 126, sonar 125, LIDAR 124, radar 123, and so on. Accordingly, depending on a particular assortment of sensors that are implemented in the vehicle 100, and, thus, data from the sensors, the context module 220 can identify the environmental context to varying degrees of specificity.

In one embodiment, the environmental context of the vehicle 100, as determined by the context module 220, indicates whether the vehicle 100 is approaching a toll booth or exiting a toll booth. Thus, the context module 220 uses the environmental context to characterize a predicted degree of acceleration/deceleration that is likely to be provided by the driver under the present circumstances. For example, the context module 220 predicts a route of the vehicle 100 when no specific destination has been entered into a navigation system in order to assess a proximity to a toll booth or another roadway location for which the vehicle systems 140 may be optimized.

The context module 220 can predict the route of the vehicle by using a current day, time, directional heading and/or other characteristic data of a route to identify the route against, for example, learned routes including routine routes or other previously traveled routes that are logged in the database 240. Consequently, the context module 220 can use at least a present location of the vehicle 100 along with knowledge of a predicted route to identify when the vehicle 100 is located proximate to a toll booth, off-ramp, upcoming intersections of the roadway, upcoming widening of the roadway, bridge entries, railroad crossings, and other locations at which acceleration and/or deceleration inputs can be predicted to optimize functioning of the vehicle 100.

The context module 220 can then use the identified environmental context and control profile to preemptively adjust operating parameters of the vehicle 100 in anticipation of receiving a control input that is similar to an input identified by the control profile. Thus, prior to a driver actually providing control inputs through activating one or more input devices of the vehicle 100, the control module 230 adjusts one or more operating parameters of the vehicle 100 to optimize the vehicle 100. In this way, the preemptive adjustment system 170 can account for upcoming accelerations or decelerations prior to an actual occurrence of the accelerations/decelerations and instead of controlling the vehicle reactively.

Figure 3:
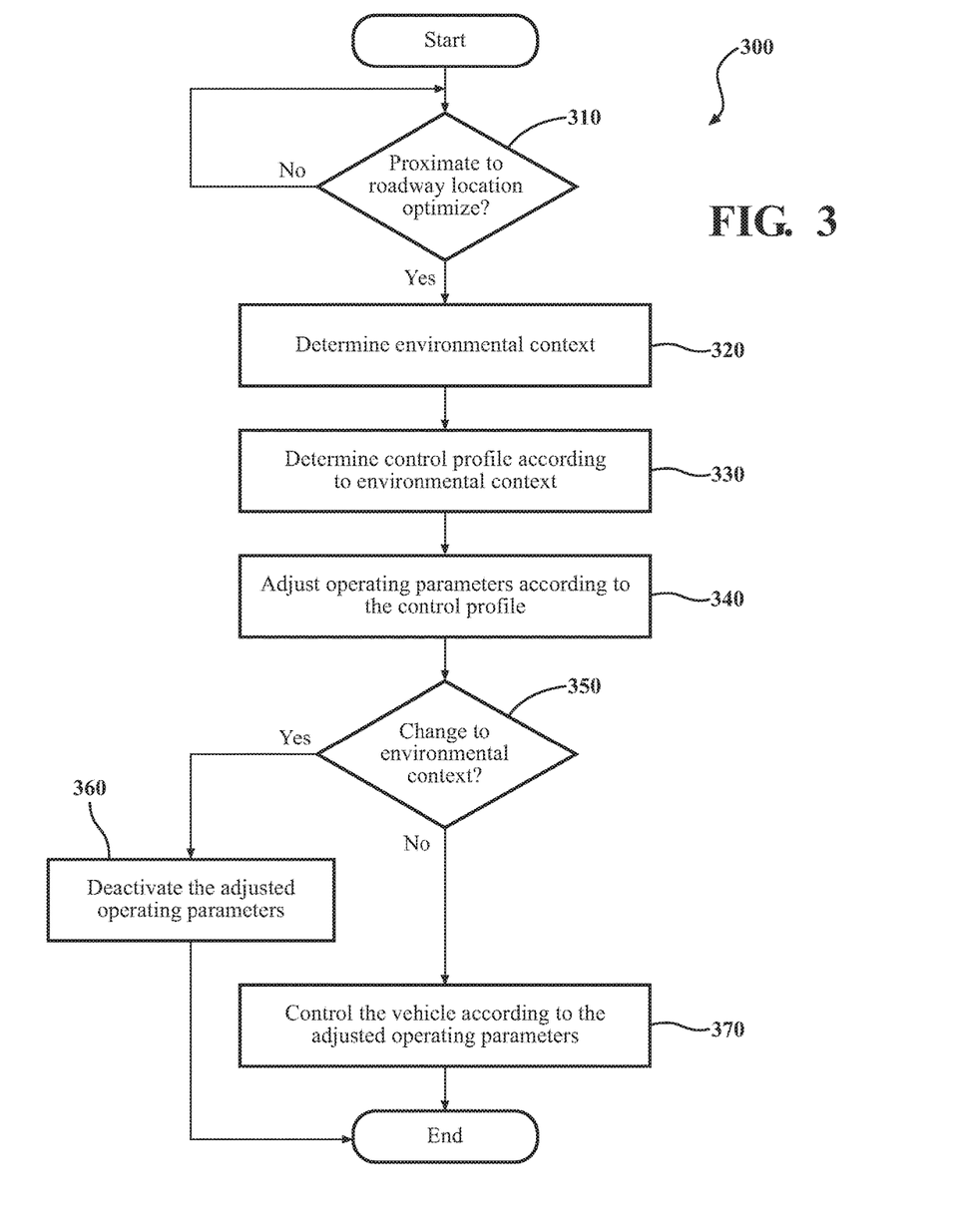
FIG. 3 illustrates one embodiment of a method that is associated with adjusting operating parameters upon detecting that a vehicle is proximate to a particular roadway location and in anticipation of a control input.

Additional aspects of preemptively adjusting the operation of the vehicle 100 will be discussed in relation to FIG. 3. FIG. 3 illustrates a method 300 associated with predicting control inputs from a driver in order to preemptively optimize the vehicle 100. Method 300 will be discussed from the perspective of the preemptive adjustment system 170 of FIGS. 1 and 2. While method 300 is discussed in combination with the preemptive adjustment system 170, it should be appreciated that the method 300 is not limited to being implemented within the preemptive adjustment system 170, but is instead one example of a system that may implement the method 300.

At 310, the context module 220 detects whether the vehicle 100 is proximate to a roadway location for which the vehicle systems 140 are to be optimized. As previously noted, the roadway location may be determined from a list of locations for which learned control inputs are available, by identifying a type of road feature (e.g., toll, merge, traffic light, etc.) associated with a particular location, or, more generally, according to locations in the roadway for which behaviors of a driver can be predicted according to learned and/or calibrated control inputs for the location.

Thus, as an initial aspect, the context module 220 analyzes sensor data from at least one sensor of the vehicle 100, at 310. Accordingly, at 310, the context module 220 may determine one or more aspects of the environmental context, as will be discussed further at 320. However, at 310, the one or more aspects of the environmental context are determined in order to identify whether the vehicle 100 is proximate to one of the roadway locations that are of interest. Thus, in one embodiment, the context module 220 generates a predicted route of the vehicle 100. The context module 220 determines a set of road segments along which the vehicle 100 is likely to travel in order to reach a predicted destination. The context module 220 uses collected data such as a current directional heading, a current time, a current day, a current location from a GPS, and/or additional characterizing information to generate the predicted route. In general, the context module 220 analyzes the collected data as a function of previously traveled routes to predict the current route.

Thereafter, the context module 220 identifies whether the vehicle 100 is proximate to or likely to encounter a roadway location of interest (e.g., toll) soon by correlating a current location with the predicted route and identified locations along the predicted route. It should be noted that while a toll is provided as an example, the context module 220 may, more specifically, identify whether the vehicle 100 is approaching the toll or stopped at the toll in order to provide for determining whether the predicted control input is an acceleration or deceleration at 340.

However, at 310, if the context module 220 does not identify a toll booth proximate to the vehicle 100 or another roadway location of interest, then monitoring continues at 310 by monitoring for sensor inputs that identify when the vehicle 100 is proximate to the roadway location of interest. In either case, if, at 310, the context module 220 identifies that the vehicle 100 is proximate to the roadway location, then processing by the context module 220 proceeds to 320. As an additional note, the context module 220 can be programmed with a defined distance for determining at what distance the vehicle 100 is sufficiently near along the predicted route to satisfy the determination at 310. It should be appreciated, that the defined distance is generally selected in order to permit the adjustments, as subsequently discussed at 340. In either case, the precise distance is selectable to account for different operating parameters that may be adjusted and for an ability to identify the locations.

At 320, the context module 220 collects data from sensors of the sensor system 120 to further determine aspects of the environmental context. The environmental context generally defines current surroundings of the vehicle 100 and aspects of how the vehicle is presently operating in addition to, for example, relevant data that occurred immediately previously (e.g., braking and acceleration patterns, etc.). In one embodiment, the context module 220 produces the environmental context as a current location/heading/speed using data from a GPS sensor. In still further embodiments, as previously noted, the context module 220 uses a suite of sensors to collect data about surrounding vehicles (e.g., whether the vehicle 100 is following another vehicle, whether an additional vehicle is next to the vehicle 100), road conditions (e.g., ice, snow, etc.), speed limits, relative speeds of other vehicles, a distance to an off-ramp, types of surrounding vehicles (e.g., large slowly accelerating vehicles vs quickly accelerating sports cars), a presence of pedestrians and/or bicycles, road grade (degree of incline or degree), road curvature, road type (e.g., gravel, asphalt, etc.), and so on.

In further embodiments, the context module 220 can collect information about the vehicle systems 140 including an engine operating temperature, engine RPM, a battery charge level, current control inputs, and other information about a current operating condition of the vehicle 100 that is relevant to predicting upcoming controls in relation to the roadway location.

Figure 4:
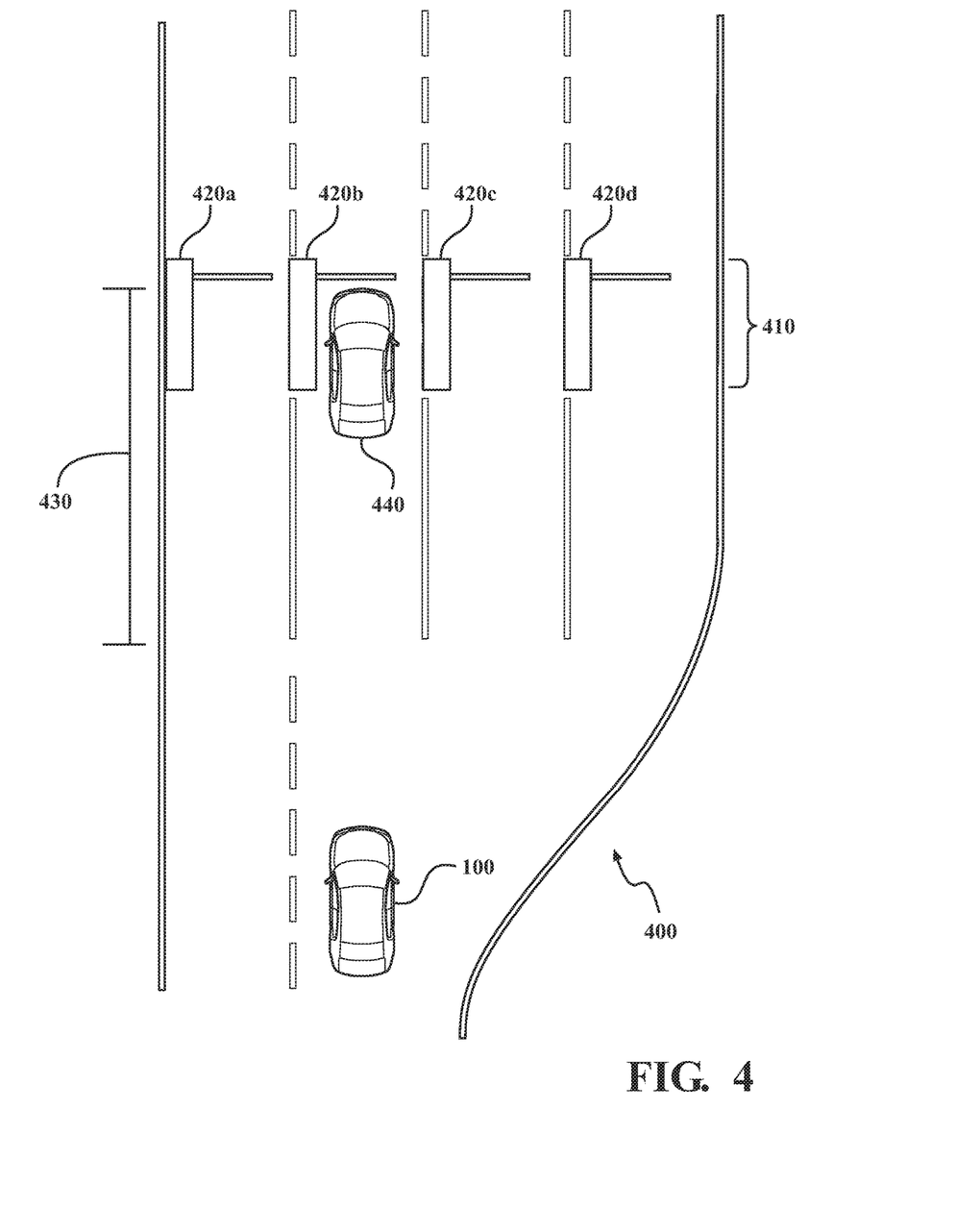
FIG. 4 illustrates an example environmental context including a toll booth and a vehicle that includes systems as disclosed herein.

As one example, consider FIG. 4, which illustrates a roadway 400 on which the vehicle 100 is approaching a toll 410. In the provided example, the roadway 400 is a two-lane roadway such as a highway or similar road. Furthermore, as shown in FIG. 4, the toll 410 consists of separate toll booths 420a, 420b, 420c, and 420d. The toll booths 420a, 420b, 420c, and 420d include a gate across the roadway 400 for preventing vehicles from continuing without providing the toll. Thus, the toll 410 is generally associated with vehicles decelerating and stopping to either obtain a toll ticket or to pay a toll.

As discussed previously at 310, as the vehicle 100 approaches the toll 410, the context module 220 is monitoring aspects of the environmental context to identify whether the vehicle 100 is approaching the toll 410. Accordingly, the context module 220 identifies that the vehicle 100 is proximate to the toll 410 from analyzing data from a GPS location in comparison to a predicted route, from a vehicle-to-infrastructure (V2I) signal, a camera identifying the toll 410, or another suitable indicator of the proximity. In one embodiment, the context module 220 identifies the vehicle 100 as being proximate to the toll 410 upon being a defined distance 430 from the toll 410. The defined distance is a distance prior to receiving a control input to decelerate the vehicle 100. In one embodiment, the distance 430 is a distance at which the vehicle 100 receives a V2I signal.

In either case, once the context module 220 identifies that the vehicle 100 is proximate to the toll 410, the context module 220 collects the additional data about the environmental context. As shown in FIG. 4, the vehicle 100 may collect information about other vehicles (e.g., vehicle 440), a number of toll booths 420a, 420b, 420c, and 420d, which of the toll booths 420a, 420b, 420c, and 420d are available, and so on. For example, the context module 220 analyzes a data stream from a forward-facing radar of the vehicle 100 to identify obstacles such as the vehicle 440 that may impede a path of the vehicle 100 and, thus, influence acceleration and deceleration inputs.

At 330, the context module 220 determines a control profile for the vehicle 100. In one embodiment, the control profile indicates a predicted acceleration or deceleration that is anticipated to be provided by a driver as a function of the environmental context (e.g., exiting a toll booth, approaching a toll booth, etc.). In one embodiment, the control profile indicates a duration and a degree of an expected/predicted control input that is anticipated to be provided by a driver as a function of surroundings of the vehicle 100 as indicated by the environmental context. Thus, the context module 220 may determine a control profile for decelerating the vehicle 100 when approaching the toll booth and a different control profile for accelerating the vehicle 100 when exiting the toll booth. In still a further embodiment, the context module 220 identifies a single control profile that indicates predicted decelerations for an approach to the toll booth and also predicted accelerations for exiting the toll booth. Thus, depending on a particular roadway location, the control profile can indicate a complex set of control inputs for the vehicle 100.

As previously noted, the control profile may be implemented in several separate ways including as learned control inputs for the driver according to the environmental context that are stored in lookup tables of the driver model 250, as defined/calibrated control inputs for different contexts, and so on. Additionally, the plurality of control profiles can be stored in the driver model 250 of the database 240 in the lookup tables according to metadata that indicates corresponding environmental contexts. Thus, whichever form in which the control profiles are implemented, the context module 220 identifies which control profile is applicable to the present environmental context by, for example, assessing various aspects of the environmental context.

In one embodiment, the context module 220 may select a control profile that is specific to the roadway location and a type of the roadway location. Thus, the control profile includes, for example, values learned from when the driver has previously driven at the same or a similar location. Furthermore, the context module 220 may parameterize the environmental context and use the parameters as an input to a lookup table or a parameterized function in order to obtain the control profile. That is, for example, the context module 220 can use a location (longitude and latitude), a context code that identifies the present circumstance (e.g., approaching toll booth), and/or additional parameters (e.g., day, time, weather, etc.) as an electronic input and receive the control profile as an output. Furthermore, the context module 220 can also analyze the environmental context to identify mitigating factors that are likely to influence an acceleration or deceleration of the vehicle 100 in order to refine the control profile. Thus, the context module 220, in one embodiment, provides parameters identifying the mitigating factors and/or adjusts the control profile to account for the mitigating factors.

Accordingly, referring again to FIG. 4, the context module 220, in one embodiment, identifies a presence of vehicles such as a vehicle 440 ahead of the vehicle 100 a speed limit around the toll 410, an amount of traffic, and other factors that influence accelerating and decelerating around the toll 410.

In either case, the context module 220 generally analyzes different aspects of the environmental context including mitigating factors such as a speed limit, road conditions, road curvature, types of surrounding vehicles (e.g., cars vs. semi-trucks), a number of lanes, traffic conditions, available fuel/battery charge, and so on when determining the control profile, at 330. Consequently, the context module 220 can use many different sensor inputs to help characterize the environmental context and predict a particular type of control that the driver is most likely to undertake in the environmental context. In this way, the preemptive adjustment system 170 can optimize the vehicle 100 at 340 to provide improved performance, efficiency, and/or safety when a corresponding control input is actually received at 370.

Moreover, the context module 220 may consider any number of the mitigating factors in combination or separately according to available sensors that provide relevant data to detect the mitigating factors. Additionally, some of the mitigating factors of the environmental context may provide information indicating limits to an ability to accelerate or decelerate (e.g., obstacles, weather conditions, etc.), while others may indicate unimpeded acceleration is feasible (e.g., no traffic).

In one embodiment, in addition to the control profile indicating a likely degree and duration of a control input, the control profile also indicates which operating parameters of the vehicle 100 to adjust. For example, depending on a type of the control inputs (e.g., strong vs. efficient), the control profile may specify different parameters that are to be adjusted. In other words, instead of adjusting an engine of the vehicle 100 to optimize performance for quicker acceleration, the context module 220 selects operating parameters to optimize fuel/battery efficiency. Once the context module 220 determines the control profile, at 340, the preemptive adjustment system 170 proceeds to block 340.

At 340, the control module 230 adjusts the operating parameters of the vehicle 100 according to the control profile. The control module 230 adjusts the operating parameters prior to receiving a control input generated by the driver operating one or more input devices (e.g., brake pedal, accelerator pedal, shifter) of the vehicle 100. Consequently, the control module 230 adjusts the vehicle 100 preemptively to optimize one or more of the vehicle systems 140 in anticipation of the control input from the driver that correlates with the predicted/expected control input.

As a general matter, the control module 230 adjusts the operating parameters of the vehicle 100 according to a degree and duration of the expected/predicted control input as identified by the control profile. Additionally, in one embodiment, the operating parameters include control aspects of the vehicle systems 140 that are related to the acceleration and/or deceleration of the vehicle 100. In one embodiment, the operating parameters are values of control registers in an engine control unit (ECU) and/or an onboard computer of the vehicle 100 that are modified by the control module 230 to cause various changes in the operation of the vehicle 100. For example, a non-exhaustive list is set forth in items (1)-(7) of vehicle systems and characteristics that may be preemptively adjusted by the control module 230.

(1) Engine RPM

Depending on a particular type of the vehicle 100, the control module 230 can adjust the operating parameters in different ways. For example, when the vehicle 100 is a hybrid electric vehicle (i.e., including both combustion and electric motors), the control module 230 can adjust an engine RPM of the combustion engine by engaging an electric motor to drive the RPM of the combustion motor without actually firing (i.e., igniting spark plugs) the combustion engine. Thus, the combustion engine is optimized to respond when an accelerator input is actually received after the combustion engine is primed.

Alternatively, when the vehicle 100 is a fully electric vehicle, the control module 230 can ramp-up an RPM of one or more electric motors while a clutch is disengaged. Once an accelerator input is received, the control module 230 can engage the clutch to the motor that is already ramped-up, thereby providing an optimized performance response.

Still, in a further example, when the vehicle 100 is implemented with only a conventional combustion engine, the control module 230 can increase engine RPM while engaging a brake. Thereafter, once an acceleration input is received, the control module 230 releases the brake to provide optimized performance from the engine that is preemptively adjusted to an increased RPM.

(2) Maximum Acceleration Rate

From an efficiency perspective, the control module 230 can cap a rate (e.g., amount of throttle) at which the vehicle 100 accelerates so that full acceleration at 100% of a possible rate is not engaged when, for example, attempting to avoid exceeding a speed limit, optimizing fuel efficiency, optimizing the use of battery charge, and so on. Thus, the control module 230 can control the vehicle 100 to accelerate according to an optimal acceleration curve that maximizes energy efficiency to achieve a desired speed.

(3) Transmission Shift Patterns

The control module 230 can adjust shift points (i.e., engine RPM values) of an automatic transmission and other aspects of how the transmission operates in order to optimize performance or energy conservation. In one example, the control module 230 automatically downshifts the transmission to provide greater torque. In yet a further embodiment, the control module 230 can optimize the shift points to decelerate the vehicle 100 and transition deceleration force from the brakes to the powertrain of the vehicle 100.

(4) Maximum Speed

The control module 230 can also limit a maximum speed of the vehicle 100 by preemptively setting a speed at which no additional acceleration is provided even if an accelerator input remains depressed by the driver.

(5) Battery Charging

The control module 230 can, for example, provide extra charge to a battery of the vehicle 100 by diverting electric use from other components, engaging a combustion motor to charge the battery in anticipation of an acceleration, and so on.

(6) Braking

The control module 230 can, for example, adjust various operating parameters of the vehicle 100 to cause precharging of brake line pressure thereby improving a response of the brakes upon receiving a brake pedal input. Additionally, in one embodiment, the control module 230 can increase an amount of regenerative braking to recharge batteries by increasing a duration of the regenerative braking and/or increasing a degree of regenerative braking when, for example, the vehicle 100 is coasting.

(7) Driver Coaching

The control module 230 can, for example, provide indications (e.g., visual or audible) to the driver about upcoming accelerations/decelerations in order to guide the driver to provide more efficient inputs or more responsive inputs. In still a further embodiment, the control module 230 can provide dynamic indications to the driver while the driver is undertaking an acceleration or deceleration to help adapt a control input generated according to the driver's actions.

The above examples of adjustments to operating parameters are intended to be exemplary and do not represent a complete listing of possible adjustments to the vehicle systems 140. It will be appreciated that the spirit of the above-noted examples may extend to other vehicle systems not discussed herein. Furthermore, it should be noted that the adjustments discussed in items (1)-(7) are performed by the control module 230 prior to receiving a control input from the driver except as otherwise noted.

Moreover, the timing of when the control module 230 executes the adjustments at 340 is, for example, generally according to a learned timing. That is, based on travel logs or other learned information from a history of the vehicle 100 and/or other vehicles from which data is collected, the control module 230 times when the adjustments occur so that, for example, an engine of the vehicle 100 is not operating at a higher RPM for an extended time while waiting for an accelerator input. Alternatively, the control module 230 adjusts the operating parameters according to sensor inputs (e.g., radar detecting leading vehicle changing lanes), according to a timer (e.g., an amount of time after a trigger event such as initially detecting a toll booth), or another indicator. In this way, the control module 230 preemptively optimizes the operation of the vehicle 100 according to a predicted control input, but prior to actually receiving a corresponding actual control input. Accordingly, when the control module 230 receives the actual control input, as expected, the vehicle 100 is prepared to operate in an optimized manner for the particular control.

Furthermore, prior to, or, alternatively, in parallel with the control module 230 controlling the vehicle 100, at 370, to operate according to the adjusted parameters, the control module 230, at 350, monitors for control inputs that vary from the expected/predicted control inputs as determined at 330 and/or monitors for changes in the environmental context that alter or otherwise undermine the previous determination at 330. That is, for example, when the vehicle 100 changes routes from the predicted route, unexpectedly pullover or otherwise operates in a manner that is inconsistent with the predicted control inputs from block 330, then the control module 230 proceeds to block 360 where the adjustments from 340 are deactivated or otherwise rescinded.

Figure 5:
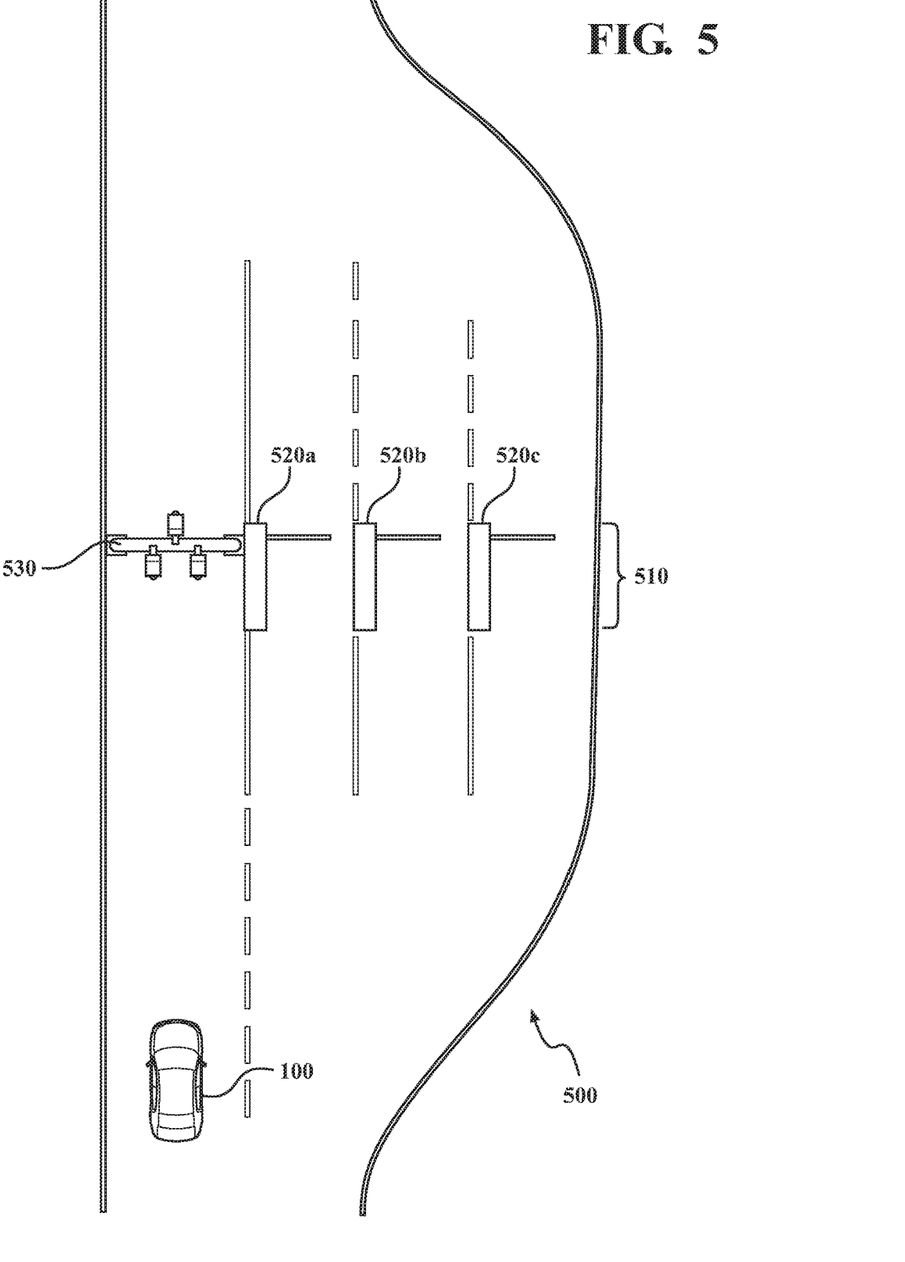
FIG. 5 illustrates an example environmental context including a toll booth with a high-speed toll.

As one example, consider FIG. 5 which illustrates a roadway 500 with a toll 510. Initially, the context module 220 of the vehicle 100 identifies the toll 510 as including gated toll booths 520a, 520b, and 520c as may be indicated on a navigational map, or simply as assumed by the context module 220. As previously noted, the gated tolls 520a, 520b, and 520c generally stop vehicles to perform toll related functions prior to permitting the vehicles to pass. Thus, the context module 220 initially identifies the toll 510 and determines the control profile at blocks 310, 320, and 330 as though the toll 510 will include the vehicle 100 decelerating to a stop on approach and then accelerating upon exiting the toll 510. Consequently, in the provided example, the control module 230 modifies regenerative braking of the vehicle 100 to increase energy recaptured as the vehicle 100 approaches the toll 510.

However, because the toll 510 also includes a high-speed toll 530, the driver may unexpectedly maneuver the vehicle 100 through the high-speed toll lane 530. Consequently, the vehicle 100 will not decelerate and then accelerate as predicted previously at 330 since the vehicle 100 will not stop for one of the toll booths 520a, 520b, or 520c. Thus, the adjustments to the operating parameters, at 340, are no longer applicable to an upcoming environmental context of the vehicle 100 because the vehicle 100 does not slow or stop when proceeding through the high-speed toll lane 530. Thus, the control module 230 detects the variance to the environmental context and deactivates the previous adjustments from block 340. Additionally, the context module 220, in one embodiment, logs the results including the environmental context and associated data including received control inputs so that the driver model 250 can be refined to account for the high-speed toll 530 on future trips.

In one embodiment, the control module 230 monitors for changes to the environmental context that influence the previous prediction from block 330, at 350, by continuously analyzing sensor inputs to determine whether the environmental context has shifted away from the originally detected environmental context from blocks 310 and 320. Alternatively, or in addition to monitoring the sensor inputs the context module 220 can also monitor received control inputs to determine whether the received control inputs align with predicted control inputs from the control profile. When the control inputs do not align and/or the context changes, the context module 220, in one embodiment, signals to the control module 230 that the control profile is no longer accurate. As a result, the control module 230 can proceed to deactivate the adjustments.

However, when no variance to the previous context is detected at 350, the control module 230 proceeds with processing at 370. At 370, the control module 230 controls the vehicle 100 to operate according to a received control input. In one embodiment, the control module 230 controls the vehicle 100 according to the operating parameters that were previously adjusted, at 340. In some circumstances, the control profile indicates a predicted control input cannot be fulfilled because of a lack of battery charge, vehicle mechanical issue, or some other factor. In these instances, the context module 220 logs information about the events and, for example, refines the control profile or generates a further control profile in an attempt to account for the occurrence in the future. In either case, at 370, the control module 230 controls the vehicle 100 to operate according to a received control input proactively using the optimized vehicle systems 140 to improve performance, fuel efficiency, and/or safety.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., the present context).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and /or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the preemptive adjustment system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the preemptive adjustment system 170, and/or the autonomous driving module(s) 160 may control some or all of these vehicle systems 140 and, thus, may be partially or fully autonomous.

The processor(s) 110, the preemptive adjustment system 170, and/or the autonomous driving module(s) 160 can be operatively connected to communicate with the various vehicle systems 140 and/or individual components thereof. For example, returning to FIG. 1, the processor(s) 110, the preemptive adjustment system 170, and/or the autonomous driving module(s) 160 can be in communication to send and/or receive information from the various vehicle systems 140 to control the movement, speed, maneuvering, heading, direction, etc. of the vehicle 100. The processor(s) 110, the preemptive adjustment system 170, and/or the autonomous driving module(s) 160 may control some or all of these vehicle systems 140.

The processor(s) 110, the preemptive adjustment system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the preemptive adjustment system 170, and/or the autonomous driving module(s) 160 can control the direction and/or speed of the vehicle 100. The processor(s) 110, the preemptive adjustment system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110 , and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the preemptive adjustment system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A preemptive adjustment system of a vehicle, comprising:
one or more processors;
a memory communicably coupled to the one or more processors and storing:
a context module including instructions that when executed by the one or more processors cause the one or more processors to determine a control profile for the vehicle based, at least in part, on an environmental context and in response to identifying that the vehicle is located proximate to a roadway location for which operating parameters of the vehicle are to be optimized, wherein the control profile indicates a predicted control input that is expected to be received through a driver input system for controlling the vehicle; and
a control module including instructions that when executed by the one or more processors cause the one or more processors to adjust the operating parameters according to the control profile to preemptively modify operation of at least one vehicle system of the vehicle in anticipation of the predicted control input to optimize changes in a speed of the vehicle upon receiving a driver control input corresponding with the predicted control input, and wherein the control module includes instructions to control the vehicle according to the operating parameters upon receiving the driver control input through the driver input system.

2. The preemptive adjustment system of claim 1, wherein the context module includes instructions to, prior to controlling the vehicle according to the operating parameters, identify the roadway location as a toll booth and identify a type of the toll booth according to sensor inputs received from one or more sensors of the vehicle, and
wherein the control module includes instructions to deactivate adjustments to the operating parameters that were made in anticipation of the predicted control input when the type of the toll booth is identified as a high-speed toll instead of a gated toll booth.

3. The preemptive adjustment system of claim 1, wherein the environmental context characterizes at least current surroundings of the vehicle including the roadway location, wherein the context module includes instructions to determine the environmental context of the vehicle including instructions to identify whether the vehicle is entering a toll booth or exiting the toll booth according to one or more sensor inputs of the vehicle, wherein the context module includes instructions to determine the control profile including instructions to analyze the environmental context as a function of a driver model including parameterizing the environmental context as an electronic input to the driver model, wherein the driver model stores a plurality of control profiles, and
wherein the control profile identifies an expected acceleration input when the environmental context indicates that the vehicle is exiting the toll booth, and an expected deceleration input when the environmental context indicates that the vehicle is approaching the toll booth.

4. The preemptive adjustment system of claim 1, wherein the context module includes instructions to determine the environmental context including instructions to collect data from one or more sensors of the vehicle to determine at least a current location and aspects of a roadway on which the vehicle is traveling,
wherein the context module includes instructions to determine the environmental context including instructions to generate a predicted route according to historical driving patterns of the vehicle that correlate with a current day and a current time, and to analyze the predicted route of the vehicle in relation to a present location to identify whether a toll booth is along the predicted route as the roadway location.

5. The preemptive adjustment system of claim 1, wherein the control module includes instructions to adjust the operating parameters to control the vehicle to modify operation of at least one vehicle system prior to receiving the driver control input and to preemptively optimize operation of the vehicle for the driver control input, and wherein the control profile indicates at least a duration of the predicted control input and a degree of the predicted control input.

6. The preemptive adjustment system of claim 1, wherein the operating parameters include at least one of: parameters to ramp-up an output of an engine of the vehicle, to limit an amount of throttle produced from an accelerator input, to pre-charge brake lines of the vehicle, and to modify charging of a battery, and wherein the control module includes instructions to adjust the operating parameters including instructions to select which of the operating parameters to adjust according to whether the control profile indicates an acceleration or a deceleration of the vehicle.

7. The preemptive adjustment system of claim 1, wherein the control module includes instructions to control the vehicle according to the operating parameters including instructions to control the vehicle using the adjusted operating parameters to improve operation of the vehicle, wherein the driver control input and the predicted control input correspond to electronic inputs generated through the driver input system from at least a brake pedal and an accelerator pedal of the vehicle, and wherein the context module includes instructions to refine a driver model according to the driver control input for the environmental context by storing data about the environmental context and the driver control input to subsequently update the driver model.

8. The preemptive adjustment system of claim 1, wherein the vehicle is a hybrid electric vehicle, and wherein the control module includes instructions to adjust the operating parameters including instructions to activate an electric motor of the vehicle to increase an rpm of a combustion engine without firing the combustion engine.

9. A non-transitory computer-readable medium storing instructions that when executed by one or more processors cause the one or more processors to:
determine a control profile for a vehicle based, at least in part, on an environmental context and in response to identifying that the vehicle is located proximate to a roadway location for which operating parameters of the vehicle are to be optimized,
wherein the control profile indicates a predicted control input that is expected to be received through a driver input system for controlling the vehicle;
adjust the operating parameters according to the control profile to preemptively modify operation of at least one vehicle system of the vehicle in anticipation of the predicted control input to optimize changes in a speed of the vehicle upon receiving the driver control input corresponding with the predicted control input; and
control the vehicle according to the operating parameters upon receiving the driver control input through the driver input system.

10. The non-transitory computer-readable medium of claim 9, wherein the environmental context characterizes at least current surroundings of the vehicle including the roadway location, wherein the instructions further include instructions to, prior to controlling the vehicle according to the operating parameters, identify the roadway location as a toll booth and identify a type of the toll booth according to sensor inputs received from one or more sensors of the vehicle, and wherein the instructions further include instructions to deactivate adjustments to the operating parameters that were made in anticipation of the predicted control input when the type of the toll booth is identified as a high-speed toll instead of a gated toll booth.

11. The non-transitory computer-readable medium of claim 9, wherein the instructions to determine the environmental context of the vehicle include instructions to identify whether the vehicle is entering a toll booth or exiting the toll booth according to one or more sensor inputs of the vehicle, wherein the instructions to determine the control profile include instructions to analyze the environmental context as a function of a driver model including parameterizing the environmental context as an electronic input to the driver model, wherein the driver model stores a plurality of control profiles, wherein the control profile identifies an expected acceleration input when the environmental context indicates that the vehicle is exiting the toll booth, and an expected deceleration input when the environmental context indicates that the vehicle is approaching the toll booth, and wherein instructions to determine the environmental context include instructions to refine the driver model according to a driver control input for the environmental context by storing data about the environmental context and the driver control input to subsequently update the driver model.

12. The non-transitory computer-readable medium of claim 9, wherein the instructions to determine the environmental context include instructions to collect data from one or more sensors of the vehicle to determine at least a current location and aspects of a roadway on which the vehicle is traveling, and wherein the instructions to determine the environmental context include instructions to generate a predicted route according to historical driving patterns of the vehicle that correlate with a current day and a current time, and to analyze the predicted route of the vehicle in relation to a present location to identify whether a toll booth is along the predicted route as the roadway location.

13. The non-transitory computer-readable medium of claim 9, wherein the instructions to control the vehicle according to the operating parameters include instructions to control the vehicle using the adjusted operating parameters to improve operation of the vehicle wherein the instructions to adjust the operating parameters include instructions to select which of the operating parameters to adjust according to whether the control profile indicates an acceleration or a deceleration of the vehicle, and wherein the driver control input and the predicted control input correspond to electronic inputs generated through the driver input system from at least a brake pedal and an accelerator pedal of the vehicle.

14. A method of preemptively adjusting operating parameters of a vehicle, comprising:

determining a control profile for the vehicle based, at least in part, on an environmental context and in response to identifying that the vehicle is located proximate to a roadway location for which the operating parameters are to be optimized, wherein the control profile indicates a predicted control input that is expected to be received through a driver input system for controlling the vehicle;

adjusting the operating parameters of the vehicle according to the control profile to preemptively modify operation of at least one vehicle system of the vehicle in anticipation of the predicted control input to optimize changes in a speed of the vehicle upon receiving a driver control input corresponding with the predicted control input; and controlling the vehicle according to the operating parameters upon receiving the driver control input through the driver input system.

15. The method of claim 14, further comprising:

prior to controlling the vehicle according to the operating parameters, identifying the roadway location as a toll booth and identifying a type of the toll booth according to sensor inputs received from one or more sensors of the vehicle; and deactivating adjustments to the operating parameters that were made in anticipation of the predicted control input when the type of the toll booth is identified as a high-speed toll instead of a gated toll booth, wherein the environmental context characterizes at least current surroundings of the vehicle including the roadway location.

16. The method of claim 14, further comprising:

determining the environmental context of the vehicle by identifying whether the vehicle is entering a toll booth or exiting the toll booth, wherein determining the control profile includes analyzing the environmental context as a function of a driver model by parameterizing the environmental context as an electronic input to the driver model that stores a plurality of control profiles, and wherein the control profile identifies an expected acceleration input when the environmental context indicates that the vehicle is exiting the toll booth, and an expected deceleration input when the environmental context indicates that the vehicle is approaching the toll booth.

17. The method of claim 14, wherein determining the environmental context includes collecting data from one or more sensors of the vehicle to determine at least a current location, and aspects of a roadway on which the vehicle is traveling, and wherein determining the environmental context includes generating a predicted route according to historical driving patterns of the vehicle that correlate with a current day and a current time, and analyzing the predicted route of the vehicle in relation to a present location to identify whether a toll booth is along the predicted route as the roadway location.

18. The method of claim 14, wherein adjusting the operating parameters controls the vehicle to modify operation of at least one vehicle system prior to receiving the driver control input to preemptively optimize operation of the vehicle for the driver control input, and wherein the control profile indicates at least a duration of the predicted control input and a degree of the predicted control input.

19. The method of claim 14, wherein the operating parameters include parameters associated with at least one of ramping-up an output of an engine of the vehicle, limiting an amount of throttle produced from an accelerator input, pre-charging brake lines of the vehicle, and modifying charging of a battery, and wherein adjusting the operating parameters includes selecting which of the operating parameters to adjust according to whether the control profile indicates an acceleration or a deceleration of the vehicle.

20. The method of claim 14, wherein controlling the vehicle according to the operating parameters includes controlling the vehicle using the adjusted operating parameters to improve operation of the vehicle, wherein the driver control input and the predicted control input correspond to electronic inputs generated through the driver input system from at least a brake pedal and an accelerator pedal of the vehicle, and wherein determining the control profile includes refining a driver model according to the driver control input for the environmental context by storing data about the environmental context and the driver control input to subsequently update the driver model.

* * * * *